US011110434B2

(12) United States Patent
Jiang et al.

(10) Patent No.: US 11,110,434 B2
(45) Date of Patent: Sep. 7, 2021

(54) RUTHENIUM-BASED CATALYST FOR HYDROGEN PRODUCTION FROM AMMONIA DECOMPOSITION, PREPARATION METHOD THEREFOR AND APPLICATION THEREOF

(71) Applicant: National Engineering Research Center of Chemical Fertilizer Catalyst, Fuzhou University, Fuzhou (CN)

(72) Inventors: Lilong Jiang, Fuzhou (CN); Yu Luo, Fuzhou (CN); Chongqi Chen, Fuzhou (CN)

( * ) Notice: Subject to any disclaimer, the term of this patent is extended or adjusted under 35 U.S.C. 154(b) by 118 days.

(21) Appl. No.: 16/691,929

(22) Filed: Nov. 22, 2019

(65) Prior Publication Data
US 2020/0164346 A1 May 28, 2020

(30) Foreign Application Priority Data
Nov. 22, 2018 (CN) .......................... 201811399363.1

(51) Int. Cl.
| | |
|---|---|
| *B01J 23/46* | (2006.01) |
| *B01J 35/00* | (2006.01) |
| *B01J 37/02* | (2006.01) |
| *B01J 37/04* | (2006.01) |
| *B01J 37/34* | (2006.01) |
| B01J 21/10 | (2006.01) |
| B01J 21/18 | (2006.01) |
| B01J 23/02 | (2006.01) |
| B01J 23/10 | (2006.01) |
| B01J 23/28 | (2006.01) |
| B01J 23/30 | (2006.01) |
| B01J 23/58 | (2006.01) |
| *C01B 3/04* | (2006.01) |

(52) U.S. Cl.
CPC ......... *B01J 23/462* (2013.01); *B01J 35/0006* (2013.01); *B01J 37/0207* (2013.01); *B01J 37/0213* (2013.01); *B01J 37/0236* (2013.01); *B01J 37/04* (2013.01); *B01J 37/344* (2013.01); B01J 21/10 (2013.01); B01J 21/18 (2013.01); B01J 23/02 (2013.01); B01J 23/10 (2013.01); B01J 23/28 (2013.01); B01J 23/30 (2013.01); B01J 23/58 (2013.01); *C01B 3/047* (2013.01)

(58) Field of Classification Search
CPC .... B01D 2251/2062; B01D 2255/1026; B01D 2256/16; B01J 23/462; B01J 32/00; B01J 37/0201; B01J 37/08; B01J 2523/821; C01B 3/047
See application file for complete search history.

(56) References Cited

U.S. PATENT DOCUMENTS

2012/0100063 A1   4/2012   Bao et al.
2019/0084831 A1*  3/2019   Andersen ............... B01J 23/755

FOREIGN PATENT DOCUMENTS

| CN | 1456491 A    | 11/2003 |
| CN | 1506300 A    | 6/2004  |
| CN | 1712132 A    | 12/2005 |
| CN | 101745387 A  | 6/2010  |
| CN | 103977828 A  | 8/2014  |
| CN | 104785255 A  | 7/2015  |
| CN | 107185534 A  | 9/2017  |
| CN | 108525663 A  | 9/2018  |
| JP | 2012152749 A | 8/2012  |

OTHER PUBLICATIONS

First Office Action issued in corresponding Japanese Patent Application No. 2019-211668, dated Dec. 1, 2020 (with English translation), 4 pages.
Abstract of Preparation of RuCNTs Nano-material by Polyol Reduction-deposition Method and Its Catalytical Performance for Ammonia Decomposition (1 page) with English translation (1 page).
"Sub-nm ruthenium cluster as an efficient and robust catalyst for decomposition and synthesis of ammonia: Break the "size shackles"", Jinpeng Li et al., Nano Research, vol. 11, pp. 4774-4785, published on Sep. 30, 2018.
First Office Action issued in corresponding Chinese Patent Application No. 201811399363.1, dated Apr. 8, 2021 (with English translation), 28 pages.

\* cited by examiner

*Primary Examiner* — Timothy C Vanoy
(74) *Attorney, Agent, or Firm* — Verrill Dana, LLP

(57) ABSTRACT

Disclosed is a ruthenium-based catalyst for hydrogen production from ammonia decomposition, comprising an active component, a promoter and a carrier, wherein the active component is ruthenium, the promoter is cesium and/or potassium, and the carrier comprises magnesium oxide, an activated carbon, cerium oxide, molybdenum oxide, tungsten oxide, barium oxide and potassium oxide. The present invention further discloses a preparation method and application of the aforementioned ruthenium-based catalyst for hydrogen production from ammonia decomposition. Compared with the prior art, the ruthenium-based catalyst for hydrogen production from ammonia decomposition provided by the present invention is low in preparation cost and simple in process, and has high catalytic activity at low temperature and good heat resistance.

16 Claims, No Drawings

RUTHENIUM-BASED CATALYST FOR HYDROGEN PRODUCTION FROM AMMONIA DECOMPOSITION, PREPARATION METHOD THEREFOR AND APPLICATION THEREOF

CROSS-REFERENCE TO RELATED APPLICATION

This application claims priority benefits to Chinese Patent Application No. 201811399363.1, filed on Nov. 22, 2018. The contents of the aforementioned application are incorporated herein by reference.

FIELD OF THE INVENTION

The present invention relates to the field of hydrogen production from ammonia decomposition, and in particular to a ruthenium-based catalyst for hydrogen production from ammonia decomposition and a preparation method and application thereof.

BACKGROUND OF THE INVENTION

The energy structure represented by traditional carbon-based fossil energy faces enormous challenges due to such issues as environmental pollution and the greenhouse effect. Hydrogen is considered to be an alternative energy source for fossil fuels in the future due to its advantages of cleanliness, high energy density per unit mass, wide availability and the like. With the gradual industrialization of hydrogen fuel cell technology, efficient and carbon-free utilization of hydrogen energy will also be achieved. A key problem that needs to be solved now is efficient and safe hydrogen storage technology.

Ammonia not only is an important inorganic chemical product, but also has distinct advantages as a hydrogen carrier. Ammonia is easy to liquefy, has irritating odor, and is non-flammable, non-toxic at low concentration, and high in hydrogen storage density. Ammonia production and transportation technology is mature, and no carbon is emitted during hydrogen production therefrom. It is an efficient, clean and safe hydrogen storage carrier.

A reaction for hydrogen production from ammonia decomposition mainly uses a noble metal catalyst represented by ruthenium and platinum, and a non-noble metal catalyst represented by iron and nickel. Non-noble metal catalysts such as iron-based and nickel-based ones have relatively good catalytic activity above 550° C., but it is difficult for them to have satisfactory catalytic performance at medium and low temperatures below 500° C. A ruthenium-based catalyst has high activity at low temperature and high stability, but its catalytic performance is closely related to the carrier, auxiliary agent and preparation method.

Chinese Patent Publication No. CN1456491A discloses a catalyst for hydrogen production from ammonia decomposition based on carbon nanotubes as a carrier, which is a catalyst having ruthenium as an active component and has good catalytic activity at 400-500° C. However, in the technical solution, methanation is liable to occur in a hydrogen atmosphere during hydrogen production from ammonia decomposition, which leads to problems such as catalyst carrier loss and catalyst structure destruction, thereby affecting the ammonia decomposition effect. Moreover the technology also has the problems of a high cost of the carbon nanotubes, high loading of the ruthenium and a high preparation cost.

Chinese patent document CN1506300A discloses a catalyst for hydrogen production from ammonia decomposition using SiO2, Al2O3 or an activated carbon as a carrier, and a preparation method thereof. The cost of the carrier is lower than that of the carbon nanotubes, but the catalytic ammonia decomposition temperature is higher than 550° C., so it has a disadvantage of high catalytic temperature.

So far, low-cost preparation of a catalyst for hydrogen production from ammonia decomposition with a relatively high catalytic activity at a low temperature is still a key technical bottleneck that restricts the ammonia decomposition hydrogen production technology. Therefore, providing a catalyst for hydrogen production from ammonia decomposition which is low in cost, simple in process and still has high catalytic activity in medium and low temperature conditions is of great significance for promoting the use of an ammonia decomposition hydrogen production process as a hydrogen source in a fuel cell.

SUMMARY OF THE INVENTION

A technical problem to be solved by the present invention is to overcome the shortcomings of low catalytic activity and low stability in low and medium temperature conditions, of a catalyst for hydrogen production from ammonia decomposition in the prior art, and thereby provide a catalyst for hydrogen production from ammonia decomposition with high stability, high ammonia decomposition catalytic activity at low and medium temperatures, high dispersion of ruthenium metal and good toxic tolerance.

Another technical problem to be solved by the present invention is to overcome the shortcomings of a high preparation cost and low stability of a catalyst for hydrogen production from ammonia decomposition in the prior art, and thereby provide a preparation method of a catalyst for hydrogen production from ammonia decomposition which is high in stability, simple in process and low in preparation cost.

Yet another technical problem to be solved by the present invention is to overcome the shortcomings of low catalytic activity and low stability in low and medium temperature conditions, of a catalyst for hydrogen production from ammonia decomposition in the prior art, and thereby provide application of a ruthenium-based catalyst for hydrogen production from ammonia decomposition in preparation of carbon-free hydrogen from ammonia decomposition.

To this end, the present invention provides a ruthenium-based catalyst for hydrogen production from ammonia decomposition, including an active component, a promoter and a carrier, wherein the active component is ruthenium, the promoter is cesium and/or potassium, and the carrier includes a composite carrier of a metal oxide and an activated carbon.

Further, a mass ratio of the active component to the promoter to the carrier is (2-6):(4-10):100.

Further, a mass ratio of the active component to the promoter to the carrier is (4-6):(5-10):100.

Further, the metal oxide consists of magnesium oxide, cerium oxide, molybdenum oxide, tungsten oxide, barium oxide, and an alkali metal oxide.

Further, a mass ratio of the magnesium oxide to the activated carbon to the cerium oxide to the molybdenum oxide to the tungsten oxide to the barium oxide to the alkali metal oxide in the carrier is (2-6):(68-80):(5-9):(1-2):(1-2):(5-9):(3-9).

Further, the activated carbon is a nitrogen-doped activated carbon, with a nitrogen-doping amount of 1-8 wt %.

Further, the alkali metal oxide consists of potassium oxide and/or sodium oxide.

In a preferred embodiment, a mass ratio of the ruthenium to the promoter to the magnesium oxide to the activated carbon to the cerium oxide to the molybdenum oxide to the tungsten oxide to the barium oxide to the potassium oxide is (4-6):(5-10):(4-6):(70-75):(7-9):(1-2):(1-2):(6-8):(4-7).

In a preferred embodiment, a mass ratio o the ruthenium to the cesium to the magnesium oxide to the activated carbon to the cerium oxide to the molybdenum oxide to the tungsten oxide to the barium oxide to the potassium oxide is 4:5:5:70:7:1.5:1.5:8:7.

Furthermore, the present invention further provides a preparation method of the aforementioned ruthenium-based catalyst for hydrogen production from ammonia decomposition, including steps of:

1) preparing a mixture by mixing, grinding and collecting a basic magnesium carbonate, an activated carbon, a basic cerium carbonate, molybdenum oxide, tungsten oxide, barium carbonate and a carbonate of an alkali metal;

2) molding the mixture to obtain a molded product;

3) impregnating the molded product in an aqueous solution of a precursor of ruthenium and an aqueous solution of a precursor of cesium and/or potassium successively, and taking out the impregnated molded product after the impregnating is completed; and 4) subjecting the impregnated molded product to drying, reduction and calcination successively to obtain the ruthenium-based catalyst for hydrogen production from ammonia decomposition.

Further, in step 3), the precursor of ruthenium is present in an amount of 3-6% by mass in the aqueous solution of the precursor of ruthenium; and the precursor of cesium and/or potassium is present in an amount of 6-10% by mass in the aqueous solution of the precursor of cesium and/or potassium.

Further, the ruthenium precursor is one or more selected from the group consisting of ruthenium chloride, ruthenium nitrate, potassium ruthenate, sodium ruthenate and ruthenium acetylacetonate;

the precursor of cesium is one or more selected from the group consisting of cesium hydroxide, cesium nitrate and cesium carbonate; and the potassium precursor is one or more selected from the group consisting of potassium hydroxide, potassium nitrate, potassium carbonate, and potassium ruthenate.

Further, in step 3), urea is further added to the aqueous solution of the precursor of ruthenium, and the urea is present in an amounted of 5-8% by mass in the aqueous solution of the precursor of ruthenium.

Further, in step 3), the impregnating is incipient impregnation carried out for 3-10 times, 5-10 min each time, at a temperature of 10-40° C. during the impregnation.

Further, in step 4), the drying is performed by irradiation using an infrared lamp.

Further, in step 4), the reduction is carried out under a reducing atmosphere of hydrogen and/or ammonia at a temperature of 300-500° C. for a period of 6-12 h.

Further, in step 4), the calcination is carried out at a temperature of 1600-2500° C.

Compared with the existing ammonia decomposition catalyst, the present invention has the following beneficial effects:

(1) The present invention provides a ruthenium-based catalyst for hydrogen production from ammonia decomposition, the catalyst including an active component, a promoter and a carrier, wherein the active component is ruthenium, the promoter is cesium and/or potassium, and the carrier includes a composite carrier of a metal oxide and an activated carbon; and the stability of the catalyst and its ammonia decomposition catalytic activity at low and medium temperatures can be improved by the cooperation of the specific promoter and carrier with the active component.

(2) The present invention provides a ruthenium-based catalyst for hydrogen production from ammonia decomposition; Further, by using the magnesium oxide, activated carbon, cerium oxide, molybdenum oxide, tungsten oxide, potassium oxide, barium oxide, and alkali metal oxide in a specific ratio as the carrier, the stability of the carrier can be improved while reducing the carbon content, and it can also promote ammonia decomposition for hydrogen production and improve the catalytic activity, and the dispersion of the active component ruthenium can reach 50% or higher.

(3) The ruthenium-based catalyst for hydrogen production from ammonia decomposition provided by the present invention has high catalytic activity at low and medium temperatures. Normal pressure detection shows that under the conditions of an ammonia volume fraction of 50% at the inlet, argon gas as a carrier gas, a space velocity of 10000 h−1, and a reaction temperature of 450° C., an ammonia conversion rate of a fixed bed reactor using the catalyst can reach 96%.

(4) The ruthenium-based catalyst for hydrogen production from ammonia decomposition provided by the present invention has good heat resistance and is not prone to methanation reaction. The catalyst is heated to 1000° C. in a hydrogen atmosphere with a volume fraction of 25% and maintained for 100 h and taken out. Under the same working conditions as described above, the ammonia decomposition conversion rate of the catalyst is measured to be 95%, indicating that the ruthenium-based catalyst for hydrogen production from ammonia decomposition provided by the present invention has good heat resistance.

(5) The ruthenium-based catalyst for hydrogen production from ammonia decomposition provided by the present invention is impregnated with cesium or potassium as a promoter for ammonia decomposition catalysis, and the carrier components further include a nitrogen-doped activated carbon, barium oxide and potassium oxide, thereby further improving the ammonia decomposition stability and catalytic activity of the catalyst.

(6) In the preparation method of the ruthenium-based catalyst for hydrogen production from ammonia decomposition provided by the invention, the raw materials of the carrier are mixed, milled and molded so that the solid raw materials are mixed uniformly, and the uniformity between the components of the catalyst is improved. Then the molded product is impregnated and reduced, so that the active component ruthenium and the promoter cesium or potassium are uniformly distributed in the solid raw materials, and with the alkali metal component added in the molded product, the catalytic activity is improved. Finally, the reduced molded product is calcined at a high temperature. On the one hand, this can effectively activate the components, especially the nitrogen-doped activated carbon, and improve the stability and catalytic activity of the ruthenium-based ammonia decomposition catalyst. On the other hand, basic magnesium carbonate, basic cesium carbonate, barium carbonate and potassium carbonate are decomposed into corresponding metal oxides to release $CO_2$ and basic groups, so that the basicity of the carrier is improved, and the electron density and structure indicated by the carrier are changed. Moreover, the binder added in the molded product volatilizes during the calcination process and unblocks carrier pores, so that the effective catalytic area is significantly increased, and the stability and catalytic activity of the ruthenium-based catalyst for hydrogen production from ammonia decomposition are further improved.

DETAILED DESCRIPTION OF THE EMBODIMENTS

The following embodiments are provided to further understand the present invention, are not limited to the preferred embodiments, and do not limit the contents and the scope of the present invention. All products that are identical or similar to the present invention, obtained by any person under enlightenment of the present invention or by combing features of the present invention and other prior art, fall within the protection scope of the present invention.

If specific experimental steps or conditions are not indicated in embodiments, such embodiments can be implemented according to operations or conditions of the conventional experimental steps described in the literature in the art. Reagents or instruments adopted, whose manufacturers are not indicated, are conventional reagent products which are commercially available.

Example 1

The embodiment provides a ruthenium-based catalyst for hydrogen production from ammonia decomposition and a preparation method thereof. The ruthenium-based ammonia decomposition catalyst is composed of 4 g of ruthenium, 5 g of cesium, 5 g of magnesium oxide, 70 g of an activated carbon, 7 g of cerium oxide, 1.5 g of molybdenum oxide, 1.5 g of tungsten oxide, 8 g of barium oxide and 7 g of potassium oxide.

A preparation method of the aforementioned ruthenium-based catalyst for hydrogen production from ammonia decomposition includes steps of:

1) ball milling and mixing a basic magnesium carbonate, an activated carbon, a basic cerium carbonate, molybdenum oxide, tungsten oxide, barium carbonate and potassium carbonate, and collecting a mixture with a particle size not exceeding 0.1 mm;

2) adding an epoxy resin to the mixture as a binder for molding to obtain a molded product;

3) adding ruthenium nitrate and cesium nitrate respectively to deionized water, and performing magnetic stirring until the solute is completely dissolved, to obtain an aqueous solution of ruthenium nitrate in an amount of 4% by mass and an aqueous solution of cesium nitrate in an amount of 5% by mass;

4) incipient impregnating the molded product in the aqueous solution of ruthenium nitrate and the aqueous solution of cesium nitrate prepared in the step 3) successively, wherein the number of times of the incipient impregnation is controlled to 6, and the impregnation is carried out each time at a temperature of 35° C., for 8 min; and after the impregnating is completed, taking out the molded product and drying the same by irradiation using an infrared lamp to obtain a impregnated molded product; and 5) reducing the impregnated molded product in a hydrogen atmosphere, wherein the reduction is controlled to a temperature of 350° C. and carried out for 9 h; and calcinating the reduced molded product at 1900° C. to obtain the ruthenium-based catalyst for hydrogen production from ammonia decomposition.

Example 2

The embodiment provides a ruthenium-based catalyst for hydrogen production from ammonia decomposition and a preparation method thereof. The ruthenium-based ammonia decomposition catalyst is composed of 6 g of ruthenium, 10 g of cesium, 2 g of magnesium oxide, 75 g of an activated carbon, 9 g of cerium oxide, 1 g of molybdenum oxide, 2 g of tungsten oxide, 6 g of barium oxide and 4 g of potassium oxide.

A preparation method of the aforementioned ruthenium-based catalyst for hydrogen production from ammonia decomposition includes steps of:

1) ball milling and mixing a basic magnesium carbonate, an activated carbon, a basic cerium carbonate, molybdenum oxide, tungsten oxide, barium carbonate and potassium carbonate, and collecting a mixture with a particle size not exceeding 0.5 mm;

2) adding an epoxy resin to the mixture as a binder for molding to obtain a molded product;

3) adding ruthenium chloride and cesium nitrate respectively to deionized water, and performing magnetic stirring until the solute is completely dissolved, to obtain an aqueous solution of ruthenium chloride in an amount of 6% by mass and an aqueous solution of cesium nitrate in an amount of 10% by mass;

4) incipient impregnating the molded product respectively in the aqueous solution of ruthenium chloride and the aqueous solution of cesium nitrate prepared in the step 3) successively, wherein the number of times of the incipient impregnation is controlled to 3, and the impregnation is carried out each time at a temperature of 10° C., for 10 min; and after the impregnating is completed, taking out the molded product and drying the same by irradiation using an infrared lamp to obtain a impregnated molded product; and 5) reducing the impregnated molded product in a hydrogen atmosphere, wherein the reduction is controlled to a temperature of 400° C. and carried out for 6 h; and calcinating the reduced molded product at 1600° C. to obtain the ruthenium-based catalyst for hydrogen production from ammonia decomposition.

Example 3

The embodiment provides a ruthenium-based catalyst for hydrogen production from ammonia decomposition and a preparation method thereof. The ruthenium-based ammonia decomposition catalyst is composed of 4 g of ruthenium, 5 g of cesium, 6 g of magnesium oxide, 72 g of an activated carbon, 8 g of cerium oxide, 1.5 g of molybdenum oxide, 1.5 g of tungsten oxide, 8 g of barium oxide and 6 g of sodium oxide.

A preparation method of the aforementioned ruthenium-based catalyst for hydrogen production from ammonia decomposition includes steps of:

1) ball milling and mixing a basic magnesium carbonate, an activated carbon, a basic cerium carbonate, molybdenum oxide, tungsten oxide, barium carbonate and sodium carbonate, and collecting a mixture with a particle size not exceeding 0.2 mm;

2) adding an epoxy resin to the mixture as a binder for molding to obtain a molded product;

3) adding ruthenium nitrate and cesium nitrate respectively to deionized water, and performing magnetic stirring until the solute is completely dissolved, to obtain an aqueous solution of ruthenium nitrate in an amount of 4% by mass and an aqueous solution of potassium nitrate in an amount of 5% by mass;

4) incipient impregnating the molded product respectively in the aqueous solution of ruthenium nitride and the aqueous solution of potassium nitrate prepared in the step 3) successively, wherein the number of times of the incipient impregnation is controlled to 10, and the impregnation is carried out each time at a temperature of 25° C., for 5 min; and after the impregnating is completed, taking out the molded product and drying the same by irradiation using an infrared lamp to obtain a impregnated molded product; and 5) reducing the impregnated molded product in a hydrogen atmosphere, wherein the reduction is controlled to a temperature of 400° C. and carried out for 8 h; and calcinating the reduced molded product at 2100° C. to obtain the ruthenium-based catalyst for hydrogen production from ammonia decomposition.

Example 4

The embodiment provides a ruthenium-based catalyst for hydrogen production from ammonia decomposition and a preparation method thereof. The ruthenium-based ammonia decomposition catalyst is composed of 2 g of ruthenium, 6 g of cesium, 6 g of magnesium oxide, 80 g of an activated carbon, 5 g of cerium oxide, 1 g of molybdenum oxide, 1 g of tungsten oxide, 6 g of barium oxide and 4 g of potassium oxide.

A preparation method of the aforementioned ruthenium-based catalyst for hydrogen production from ammonia decomposition includes steps of:

1) ball milling and mixing a basic magnesium carbonate, an activated carbon, a basic cerium carbonate, molybdenum oxide, tungsten oxide, barium carbonate and potassium carbonate, and collecting a mixture with a particle size not exceeding 0.05 mm;

2) adding an epoxy resin to the mixture as a binder for molding to obtain a molded product;

3) adding ruthenium nitrate to deionized water containing urea, adding cesium carbonate to deionized water, and performing magnetic stirring until the solute is completely dissolved, to obtain an aqueous solution of ruthenium nitrate containing urea in an amount of 2% by mass and an aqueous solution of cesium carbonate in an amount of 6% by mass, wherein the urea is present in an amount of 8% by mass in the aqueous solution of ruthenium nitrate containing urea;

4) incipient impregnating the molded product respectively in the aqueous solution of ruthenium nitride containing urea and the aqueous solution of cesium carbonate prepared in the step 3) successively, wherein the number of times of the incipient impregnation is controlled to 8, and the impregnation is carried out each time at a temperature of 30° C., for 7 min; and after the impregnating is completed, taking out the molded product and drying the same by irradiation using an infrared lamp to obtain a impregnated molded product; and 5) reducing the impregnated molded product in a hydrogen atmosphere, wherein the reduction is controlled to a temperature of 360° C. and carried out for 8 h; and calcinating the reduced molded product at 1750° C. to obtain the ruthenium-based catalyst for hydrogen production from ammonia decomposition.

Example 5

The embodiment provides a ruthenium-based catalyst for hydrogen production from ammonia decomposition and a preparation method thereof. The ruthenium-based ammonia decomposition catalyst is composed of 4 g of ruthenium, 10 g of cesium, 5 g of magnesium oxide, 70 g of an activated carbon, 7 g of cerium oxide, 1.5 g of molybdenum oxide, 1 g of tungsten oxide, 8 g of barium oxide and 9 g of potassium oxide.

A preparation method of the aforementioned ruthenium-based catalyst for hydrogen production from ammonia decomposition includes steps of:

1) ball milling and mixing a basic magnesium carbonate, an activated carbon, a basic cerium carbonate, molybdenum oxide, tungsten oxide, barium carbonate and potassium carbonate, and collecting a mixture with a particle size not exceeding 0.3 mm;

2) adding an epoxy resin to the mixture as a binder for molding to obtain a molded product;

3) adding ruthenium nitrate to deionized water containing urea, adding cesium nitrate to deionized water, and performing magnetic stirring until the solute is completely dissolved, to obtain an aqueous solution of ruthenium nitrate containing urea in an amount of 4% by mass and an aqueous solution of cesium nitrate in an amount of 10% by mass, wherein the urea is present in an amount of 6% by mass in the aqueous solution of ruthenium nitrate containing urea;

4) incipient impregnating the molded product respectively in the aqueous solution of ruthenium nitride containing urea and the aqueous solution of cesium nitrate prepared in the step 3) successively, wherein the number of times of the incipient impregnation is controlled to 5, and the impregnation is carried out each time at a temperature of 20° C., for 9 min; and after the impregnating is completed, taking out the molded product and drying the same by irradiation using an infrared lamp to obtain a impregnated molded product; and 5) reducing the impregnated molded product in an ammonia atmosphere, wherein the reduction is controlled to a temperature of 500° C. and carried out for 12 h; and calcinating the reduced molded product at 2000° C. to obtain the ruthenium-based catalyst for hydrogen production from ammonia decomposition.

Comparative Example 1

The comparative embodiment provides a ruthenium-based catalyst for hydrogen production from ammonia decomposition and a preparation method thereof. The ruthenium-based ammonia decomposition catalyst is composed of 4 g of ruthenium, 5 g of cesium, 5 g of magnesium oxide, 73 g of an activated carbon, 7 g of cerium oxide, 8 g of barium oxide and 7 g of potassium oxide.

A preparation method of the aforementioned ruthenium-based catalyst for hydrogen production from ammonia decomposition includes steps of:

1) ball milling and mixing a basic magnesium carbonate, an activated carbon, a basic cerium carbonate, barium carbonate and potassium carbonate, and collecting a mixture with a particle size not exceeding 0.1 mm;

2) adding an epoxy resin to the mixture as a binder for molding to obtain a molded product;

3) adding ruthenium nitrate and cesium nitrate respectively to deionized water, and performing magnetic stirring until the solute is completely dissolved, to obtain an aqueous solution of ruthenium nitrate in an amount of 4% by mass and an aqueous solution of cesium nitrate in an amount of 5% by mass;

4) incipient impregnating the molded product respectively in the aqueous solution of ruthenium nitride and the aqueous solution of cesium nitrate prepared in the step 3) successively, wherein the number of times of the incipient impregnation is controlled to 6, and the impregnation is carried out each time at a temperature of 35° C., for 8 min; and after the impregnating is completed, taking out the molded product and drying the same by irradiation using an infrared lamp to obtain a impregnated molded product; and 5) reducing the impregnated molded product in a hydrogen atmosphere, wherein the reduction is controlled to a temperature of 350° C. and carried out for 9 h; and calcinating the reduced molded product at 1900° C. to obtain the ruthenium-based catalyst for hydrogen production from ammonia decomposition.

Comparative Example 2

The comparative embodiment provides a ruthenium-based catalyst for hydrogen production from ammonia decomposition and a preparation method thereof. The ruthenium-based ammonia decomposition catalyst is composed of 6 g of ruthenium, 6 g of cesium, 75 g of magnesium oxide, 8 g of cerium oxide, 1.5 g of molybdenum oxide, 1.5 g of tungsten oxide, 8 g of barium oxide and 6 g of potassium oxide.

A preparation method of the aforementioned ruthenium-based catalyst for hydrogen production from ammonia decomposition includes steps of:

1) ball milling and mixing a basic magnesium carbonate, a basic cerium carbonate, molybdenum oxide, tungsten oxide, cesium carbonate and potassium carbonate, and collecting a mixture with a particle size not exceeding 0.2 mm;

2) adding an epoxy resin to the mixture as a binder for molding to obtain a molded product;

3) adding ruthenium nitrate and cesium carbonate to deionized water, and performing magnetic stirring until the solute is completely dissolved, to obtain an aqueous solution of ruthenium nitrate in an amount of 6% by mass and an aqueous solution of cesium carbonate in an amount of 6% by mass;

4) incipient impregnating the molded product in the aqueous solution of ruthenium nitrate and the aqueous solution of cesium carbonate prepared in the step 3) successively, wherein the impregnation is controlled to a temperature of 25° C.; and after the impregnating is completed, taking out the molded product and drying the same by irradiation using an infrared lamp to obtain a impregnated molded product; and 5) reducing the impregnated molded product in a hydrogen atmosphere, wherein the reduction is controlled to a temperature of 450° C. and carried out for 8 h; and calcinating the reduced molded product at 2100° C. to obtain the ruthenium-based catalyst for hydrogen production from ammonia decomposition.

Comparative Example 3

The comparative embodiment provides a ruthenium-based catalyst for hydrogen production from ammonia decomposition and a preparation method thereof. The ruthenium-based ammonia decomposition catalyst is composed of 4 g of ruthenium, 86 g of an activated carbon, 8 g of barium oxide and 6 g of potassium oxide.

A preparation method of the aforementioned ruthenium-based catalyst for hydrogen production from ammonia decomposition includes steps of:

1) ball milling and mixing an activated carbon, barium carbonate and potassium carbonate, and collecting a mixture with a particle size not exceeding 0.05 mm;

2) adding an epoxy resin to the mixture as a binder for molding to obtain a molded product;

3) adding ruthenium nitrate to deionized water, and performing magnetic stirring until the solute is completely dissolved, to obtain an aqueous solution of ruthenium nitrate in an amount of 4% by mass;

4) incipient impregnating the molded product in the aqueous solution of ruthenium nitrate prepared in the step 3) successively, wherein the impregnation is controlled to a temperature of 25° C.; and after the impregnating is completed, taking out the molded product; and 5) reducing the impregnated molded product in a hydrogen atmosphere, wherein the reduction is controlled to a temperature of 350° C. and carried out for 6 h; and calcinating the reduced molded product at 1900° C. to obtain the ruthenium-based catalyst for hydrogen production from ammonia decomposition.

Test Example 1

The ruthenium-based catalysts for hydrogen production from ammonia decomposition prepared in the above Examples 1-5 and Comparative Examples 1-3 were subjected to an ammonia decomposition catalytic activity test, and the test procedure was as follows: equivalent amounts of the above-mentioned ruthenium-based catalyst for hydrogen production from ammonia decomposition were respectively put into a fixed bed, with a mixture of ammonia gas and argon gas as a reaction gas, wherein the ammonia gas has a volume fraction of 50%, and a space velocity of 10000 h−1, the working pressure is normal pressure, and the reaction temperature is 400-500° C., and a gas composition at an outlet of the fixed bed was tested. Corresponding test results were as follows:

TABLE 1

| Ammonia conversion rate at outlet of fixed bed (%) | | |
|---|---|---|
| | Ammonia conversion rate (%) | |
| | Reaction temperature 400° C. | Reaction temperature 450° C. |
| Example 1 | 96.1 | 99.1 |
| Example 2 | 96.8 | 99.2 |
| Example 3 | 86.7 | 95.0 |
| Example 4 | 95.3 | 98.9 |
| Example 5 | 96.6 | 99.5 |
| Comparative Example 1 | 73.6 | 88.5 |
| Comparative Example 2 | 67.3 | 81.1 |
| Comparative Example 3 | 18.2 | 43.1 |

As can be seen from Table 1, the ruthenium-based ammonia decomposition catalyst used in the present invention has a good ammonia decomposition catalytic activity at 400-500° C. Due to the impregnation by the cesium or potassium promoter, and the cooperation and synergism with the components in the carrier, the catalytic activity of the ammonia decomposition catalytic activity is significantly improved.

Test Example 2

The ruthenium-based catalysts for hydrogen production from ammonia decomposition prepared in the above Examples 1-5 and Comparative Examples 1-3 were subjected to a thermal stability test: the catalyst was heated to 1000° C. in a hydrogen atmosphere with a volume fraction of 25% and maintained for 100 h and taken out; and the ammonia decomposition catalytic activity of the catalyst was tested at 400° C. using the test method in Test Example 1, as shown in Table 2 below:

TABLE 2

Ammonia conversion rate at outlet of fixed bed (%)

|  | Ammonia conversion rate (%) at outlet |
|---|---|
| Example 1 | 95.6 |
| Example 2 | 93.5 |
| Example 3 | 84.9 |
| Example 4 | 93.8 |
| Example 5 | 96.1 |
| Comparative Example 1 | 66.2 |
| Comparative Example 2 | 67.1 |
| Comparative Example 3 | 11.7 |

As can be seen from Table 2, the ruthenium-based ammonia decomposition catalyst used in the present invention can still ensure very high activity after being treated under a high-temperature hydrogen atmosphere, which shows that it has good heat resistance and methanation resistance.

Obviously, the embodiments described above are merely examples for clear description, and are not intended to limit the implementations. Other variations or modifications of the various forms may also be made by those skilled in the art based on the above description. There is no need and no way to exhaust all of the implementations here. Obvious variations or modifications derived therefrom are still within the protection scope of the invention-creation.

The invention claimed is:

1. A ruthenium-based catalyst for hydrogen production from ammonia decomposition, comprising an active component, a promoter and a carrier, wherein the active component is ruthenium, the promoter is cesium and/or potassium, and the carrier comprises a composite carrier of a metal oxide and an activated carbon.

2. The ruthenium-based catalyst according to claim 1, wherein a mass ratio of the active component to the promoter to the carrier is (2-6):(4-10):100.

3. The ruthenium-based catalyst according to claim 1, wherein the metal oxide consists of magnesium oxide, cerium oxide, molybdenum oxide, tungsten oxide, barium oxide, and an alkali metal oxide.

4. The ruthenium-based catalyst according to claim 2, wherein the metal oxide consists of magnesium oxide, cerium oxide, molybdenum oxide, tungsten oxide, barium oxide, and an alkali metal oxide.

5. The ruthenium-based catalyst according to claim 3, wherein a mass ratio of the magnesium oxide to the activated carbon to the cerium oxide to the molybdenum oxide to the tungsten oxide to the barium oxide to the alkali metal oxide in the carrier is (2-6):(68-80):(5-9):(1-2):(1-2):(5-9):(3-9).

6. The ruthenium-based catalyst according to claim 4, wherein a mass ratio of the magnesium oxide to the activated carbon to the cerium oxide to the molybdenum oxide to the tungsten oxide to the barium oxide to the alkali metal oxide in the carrier is (2-6):(68-80):(5-9):(1-2):(1-2):(5-9):(3-9).

7. The ruthenium-based catalyst according to claim 3, wherein the activated carbon is a nitrogen-doped activated carbon, with a nitrogen-doping amount of 1-8 wt %; and the alkali metal oxide consists of potassium oxide and/or sodium oxide.

8. The ruthenium-based catalyst according to claim 4, wherein the activated carbon is a nitrogen-doped activated carbon, with a nitrogen-doping amount of 1-8 wt %; and the alkali metal oxide consists of potassium oxide and/or sodium oxide.

9. The ruthenium-based catalyst according to claim 5, wherein the activated carbon is a nitrogen-doped activated carbon, with a nitrogen-doping amount of 1-8 wt %; and the alkali metal oxide consists of potassium oxide and/or sodium oxide.

10. The ruthenium-based catalyst according to claim 6, wherein the activated carbon is a nitrogen-doped activated carbon, with a nitrogen-doping amount of 1-8 wt %; and the alkali metal oxide consists of potassium oxide and/or sodium oxide.

11. A preparation method of the ruthenium-based catalyst of claim 3, comprising steps of:
1) preparing a mixture by mixing, grinding and collecting a basic magnesium carbonate, an activated carbon, a basic cerium carbonate, molybdenum oxide, tungsten oxide, barium carbonate and a carbonate of an alkali metal;
2) molding the mixture to obtain a molded product;
3) impregnating the molded product in an aqueous solution of a precursor of ruthenium and an aqueous solution of a precursor of cesium and/or potassium successively, and taking out the impregnated molded product after the impregnating is completed; and
4) subjecting the impregnated molded product to drying, reduction and calcination successively to obtain the ruthenium-based catalyst for hydrogen production from ammonia decomposition.

12. The preparation method of the ruthenium-based catalyst according to claim 11, wherein in step 3), the precursor of ruthenium is present in an amount of 3-6% by mass in the aqueous solution of the precursor of ruthenium;
the precursor of cesium and/or potassium is present in an amount of 6-10% in the aqueous solution of the precursor of cesium and/or potassium; and/or
the ruthenium precursor is one or more selected from the group consisting of ruthenium chloride, ruthenium nitrate, potassium ruthenate, sodium ruthenate and ruthenium acetylacetonate;
the precursor of cesium is one or more selected from the group consisting of cesium hydroxide, cesium nitrate and cesium carbonate; and
the potassium precursor is one or more selected from the group consisting of potassium hydroxide, potassium nitrate, potassium carbonate, and potassium ruthenate.

13. The preparation method of the ruthenium-based catalyst according to claim 11, wherein in step 3), urea is further added to the aqueous solution of the precursor of ruthenium, and the urea is present in an amount of 5-8% by mass in the aqueous solution of the precursor of ruthenium; and/or
in step 3), the impregnating is incipient impregnation carried out for 3-10 times, 5-10 min each time, at a temperature of 10-40° C. during the impregnation.

14. The preparation method of the ruthenium-based catalyst according to claim 11, wherein in step 4), the drying is performed by irradiation using an infrared lamp; and/or
the reduction is carried out under a reducing atmosphere of hydrogen and/or ammonia at a temperature of 300-500° C. for a period of 6-12 h; and/or
the calcination is carried out at a temperature of 1600-2500° C.

15. A method for preparing carbon-free hydrogen from ammonia decomposition, comprising carrying out ammonia decomposition in the presence of the ruthenium-based catalyst of claim 1.

16. The method according to claim 15, wherein the ammonia decomposition is carried out at a temperature of 400° C. to 500° C. under normal pressure.

* * * * *